H. L. BEACH.
MOTOR CONTROL SYSTEM.
APPLICATION FILED OCT. 23, 1913.
1,168,048.
Patented Jan. 11, 1916.
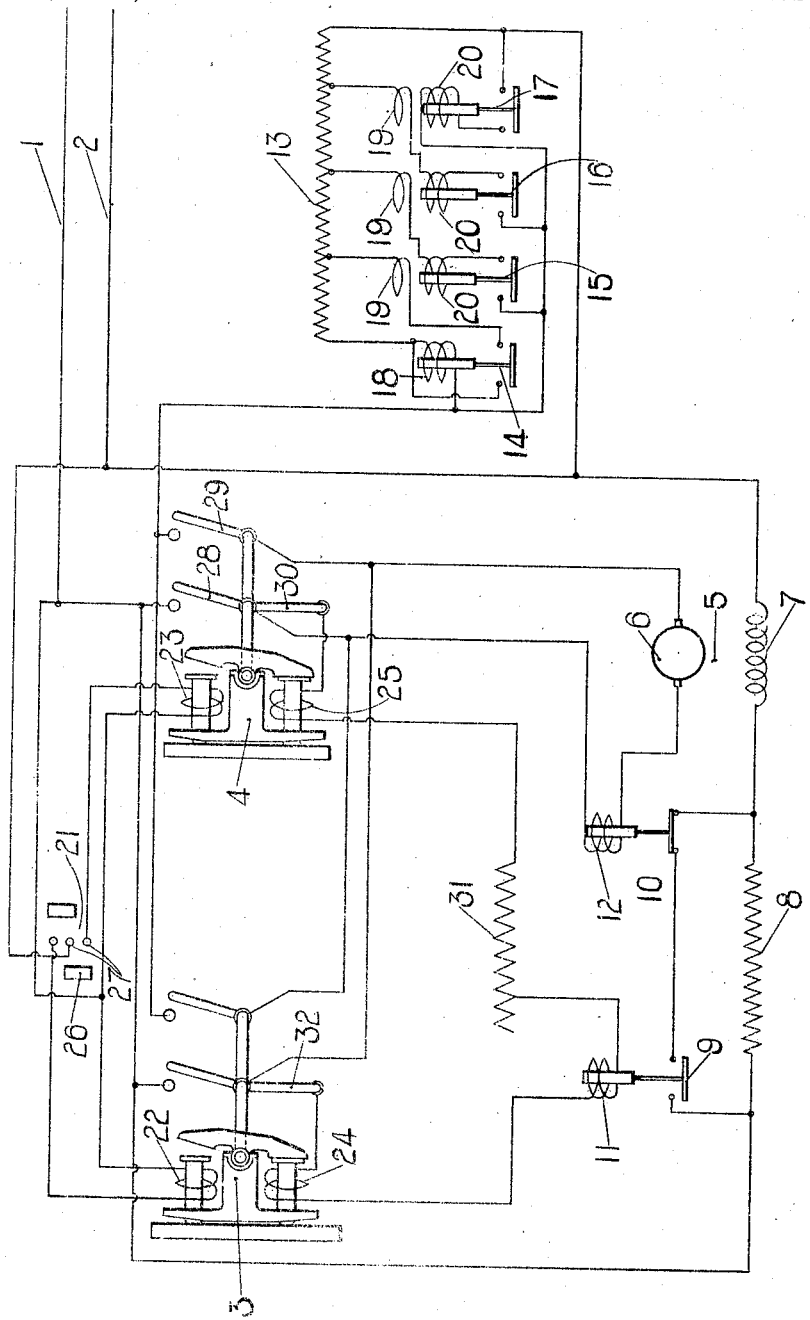
WITNESSES:
R. J. Fitzgerald
G. R. Langley
INVENTOR
Howard L. Beach
BY
Wesley G. Carr
ATTORNEY

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,168,048.  Specification of Letters Patent.  Patented Jan. 11, 1916.

Application filed October 23, 1913. Serial No. 796,831.

*To all whom it may concern:*

Be it known that I, HOWARD L. BEACH, a citizen of the United States, and a resident of Edgewood Park, in the county of Allegheny and State of Pennsylvania, have invented a new and useful Improvement in Motor-Control Systems, of which the following is a specification.

My invention relates to motor control systems, and it has particular reference to systems which employ dynamic braking for the purpose of bringing motors to rest.

My invention has for its object to provide a simple and efficient means whereby dynamic braking may be effected automatically to bring motors to rest safely and quickly.

I have provided a system in which dynamic braking occurs automatically when the controller is moved to its "off" position. Current-limit devices are employed to automatically control the dynamic braking circuit during the period of bringing the motor to rest. An advantage of my system is that no mechanical operation is required except the usual movement of the controller to open and close the motor circuit. Since the system is entirely automatic in its operation, the attention and loss of time required for manual operation are avoided. The current-limit devices insure that the desired maximum breaking current will be employed to bring the motor to rest in the minimum time consistent with safety.

In the accompanying drawings, the single figure is a diagrammatic view of circuits and apparatus embodying my invention.

Current is supplied from line conductors 1 and 2 through two-pole double throw electromagnetic switches 3 and 4 to a motor 5 that is to be controlled. The motor comprises an armature, indicated at 6, and a shunt field winding 7 that is controlled by a resistor 8.

A short circuit for the resistor 8 is controlled by two electromagnetic switches 9 and 10 comprising actuating coils 11 and 12 which are included in the dynamic braking circuit of the motor. The coil 12 is also in series with the motor armature during the normal operation of the motor. The coil 11 is preferably adjusted to allow the switch 9 to open at a low-current value. The coil 12 is arranged to open when the armature current reaches a value slightly above that of normal full-load current.

A sectional starting resistor 13 is controlled by successively actuated electromagnetic switches 14, 15, 16 and 17 which are connected to intermediate points of the resistor. The switch 14 is provided with a coil 18 which serves both as an actuating and as a holding coil. Each of the switches 15, 16 and 17 is provided with an actuating coil 19 which is in series with the preceding switch and with a holding coil 20 which is in series with its own contact terminals.

A controller 21 controls the direction of rotation of the motor through the electromagnetic switches 3 and 4. The switches 3 and 4 comprise shunt actuating coils 22 and 23 and series holding coils 24 and 25 which are included in the dynamic braking circuit. As illustrated, the controller is shown in its "off" or inoperative position. In starting the motor, the controller is moved to the right or to the left, according to the direction in which it is desired to rotate the motor. Assuming that the controller is moved to the right so that a contact segment 26 bridges the two lower contact fingers 27, the coil 23 is energized to close the switch 4 and complete a circuit which extends from the line conductor 1, through the switch arm 28, coil 12, armature 6, switch arm 29, coil 18 and resistor 13 to line conductor 2. The coil 18 is thus energized to close the switch 14 and thereby complete a short circuit for one section of the resistor 13 through the actuating coil 19 of the switch 15. The switches 15, 16, and 17 will then close in succession to short circuit the corresponding sections of the resistor 13. The holding coils 20 of the switches 15 and 16 will maintain the closure of the respective switches until the succeeding switch has closed. The closing of the switch 17, however, connects its holding coil 20 in series with a short circuit for the entire resistor 13, thus insuring that the resistor will be cut out during the operation of the motor under load. When the controller is thrown to the "off" position, as illustrated, the coil 23 is deënergized and the switch 4 operates, by force of gravity, to open the motor-operating circuit and to close a dynamic braking circuit which extends from the armature 6 through the coil 12, switch arm 30, coil 25, brake resistor 31, coil 11, coil 24 and switch arm 32, back to the motor armature. The coil 11, which is thus energized, closes the switch 9 to complete a short circuit for the field resistor 8 and thereby strengthen the field of the motor. In case the braking current reaches a predetermined value which may be slightly above normal full load value, the coil 12 is sufficiently energized to open the switch 10 and break the short circuit for the resistor 8. The motor field is thus weakened and the breaking current is correspondingly decreased. When the current falls below the predetermined value for opening the switch 10, the latter closes. The oscillation of the switch 10 occurs as long as the breaking current tends to exceed the value for which the coil 12 is adjusted. The breaking current is thus kept within such limits that the motor is brought to rest as quickly as is consistent with safety. When the controller 21 is moved to either of its operating positions, the dynamic braking circuit is broken by the switch arm 30 or the switch arm 32, as the case may be.

I claim as my invention:

1. In a motor control system, the combination with a motor having a field winding, and a resistor for controlling said winding, of a short circuit for said resistor, and current-limit devices operable at different predetermined values for controlling said circuit.

2. In a motor control system, the combination with a motor having a field winding, and a resistor for controlling said winding, of a dynamic braking circuit for said motor, and means for shunting said resistor when the current traversing said circuit exceeds a predetermined value and is less than a second and higher predetermined value.

3. In a motor control system, the combination with a motor having a field winding, and a resistor for controlling said winding, of a dynamic braking circuit comprising means actuated at different predetermined current values for controlling said resistor.

4. In a motor control system, the combination with a motor having a field winding, a resistor in series with said winding, and a shunt circuit for said resistor, of a dynamic braking circuit for said motor, and means operable at predetermined maximum and minimum values of current in said braking circuit for controlling said shunt circuit.

5. In a motor control system, the combination with a motor having a field winding, of a resistor in series with said winding, a shunt circuit for said resistor, a dynamic braking circuit for said motor, and a plurality of electromagnetic switches having coils in said braking circuit operable at different predetermined current values for controlling said shunt circuit.

6. In a motor control system, the combination with a motor having a field winding, of an operating circuit for said motor, a dynamic braking circuit for said motor, means for automatically closing said braking circuit when the operating circuit is opened, and means controlled by progressively higher predetermined current values of said braking circuit for closing and opening a shunt circuit for said field winding.

7. In a motor control system, the combination with a motor, an operating circuit, and a dynamic braking circuit, of means for connecting said motor in one of said circuits and, at the same time, disconnecting the motor from the other circuit, and means comprising current-limit devices operable at different predetermined values for controlling the current values in said dynamic braking circuit.

8. In a motor control system, the combination with a motor having a field winding, of a dynamic braking circuit for said motor, means for controlling said field winding comprising a plurality of magnet switches having coils included in said braking circuit, one of said coils being arranged to operate at a higher current value than the other.

9. In a motor control system, the combination with a motor having a field winding, of a resistor in series with said winding, a shunt circuit for said resistor, a dynamic braking circuit for said motor, a plurality of electromagnetic switches having coils in said braking circuit, one of said switches being arranged to close said shunt circuit at a predetermined current value, and a second switch being arranged to open said shunt circuit at a higher predetermined current value.

In testimony whereof, I have hereunto subscribed my name this 17th day of Oct. 1913.

HOWARD L. BEACH.

Witnesses:
  Geo. W. Huey,
  B. B. Hines.